J. G. SWALLOW & W. E. McCOY.
METER AND OUTLET BOX.
APPLICATION FILED FEB. 6, 1909.
993,123.
Patented May 23, 1911.
2 SHEETS—SHEET 1.
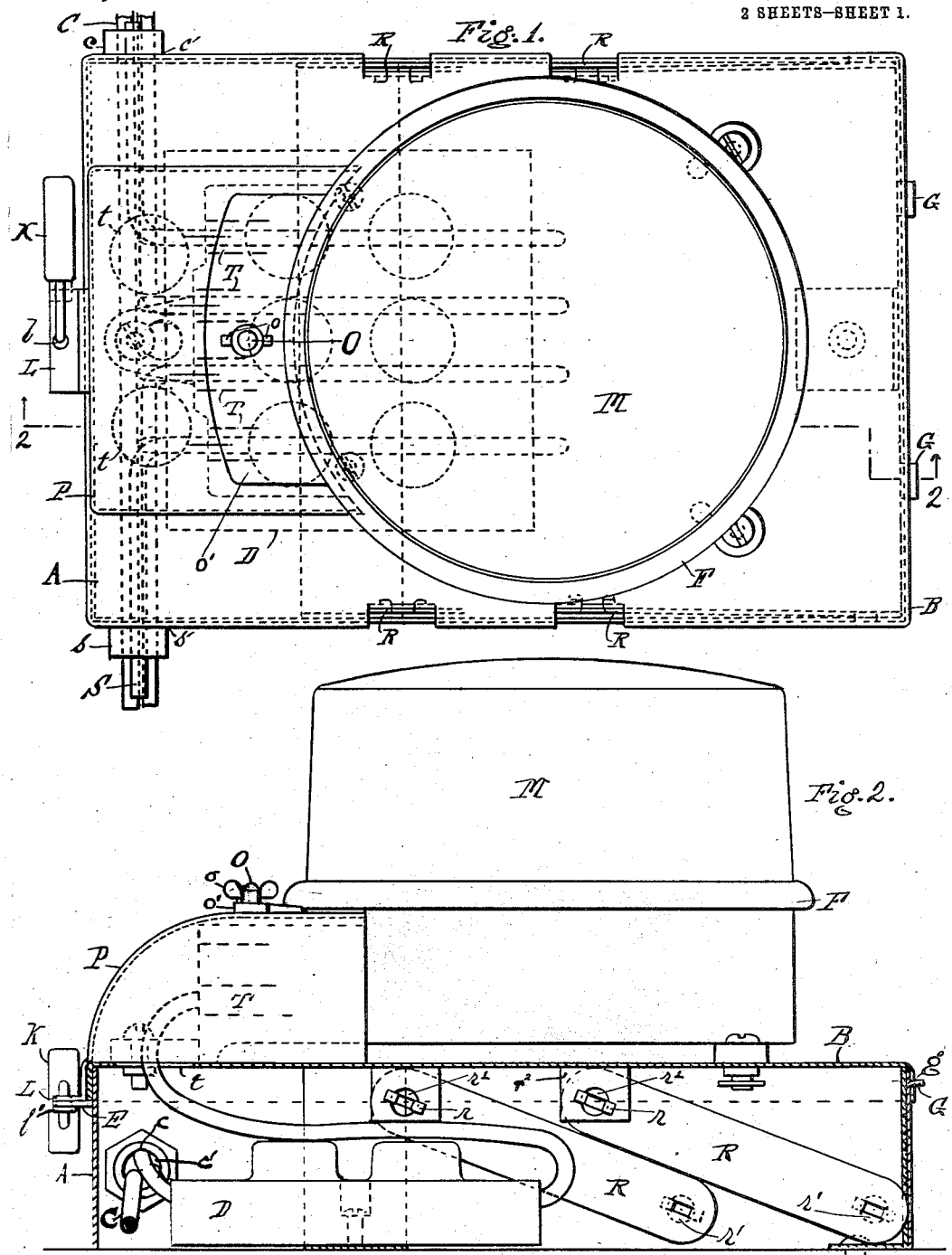

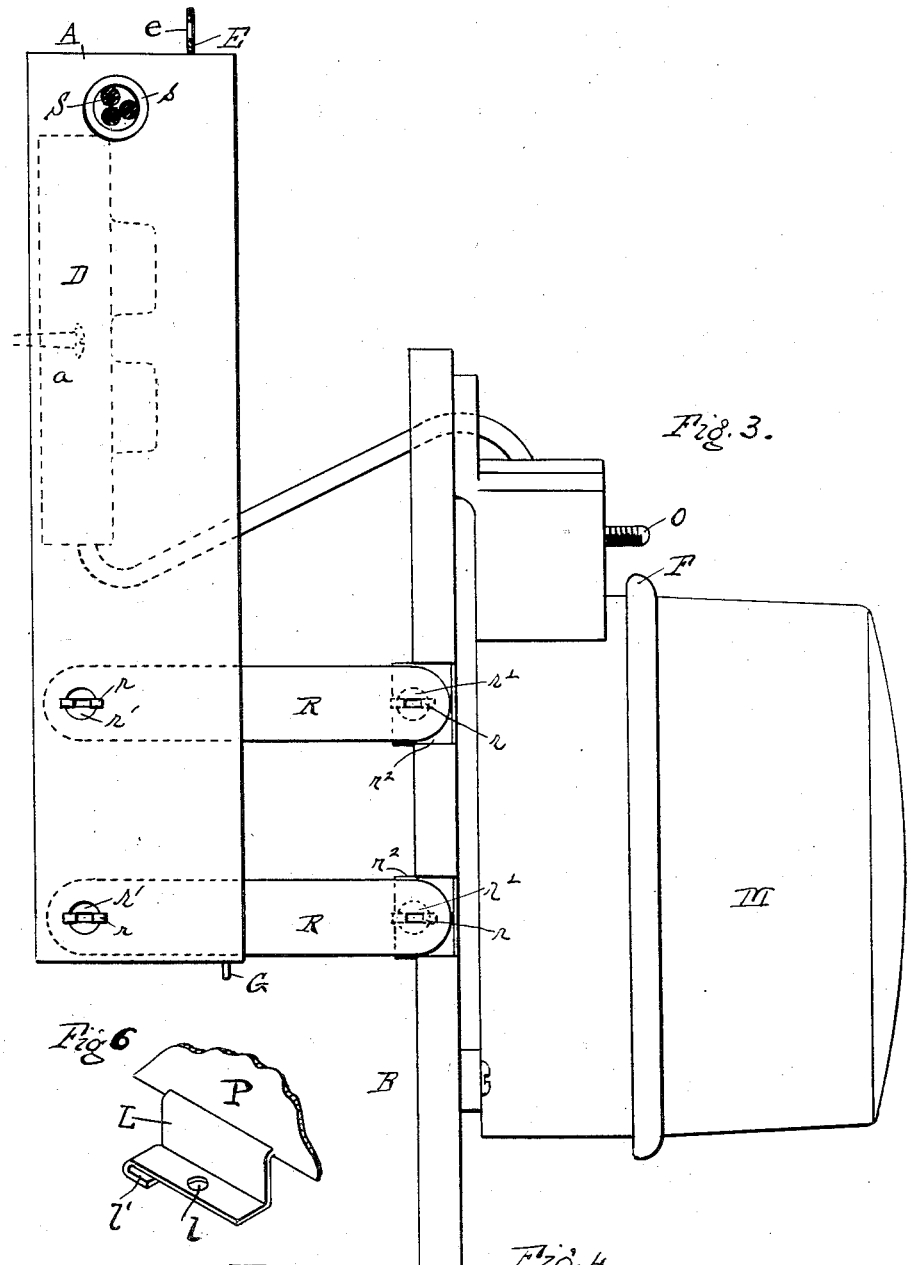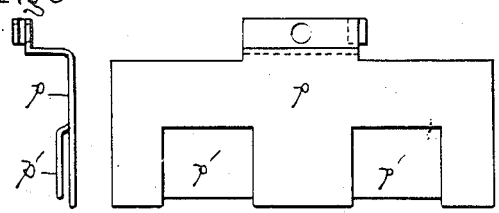

UNITED STATES PATENT OFFICE.

JOSEPH G. SWALLOW AND WALTER E. McCOY, OF NEW YORK, N. Y., ASSIGNORS OF ONE-THIRD TO FRANK W. SMITH, OF NEW YORK, N. Y.

METER AND OUTLET BOX.

993,123.

Specification of Letters Patent. Patented May 23, 1911.

Application filed February 6, 1909. Serial No. 476,484.

*To all whom it may concern:*

Be it known that we, JOSEPH G. SWALLOW and WALTER E. McCOY, citizens of the United States of America, and residents of New York city, New York, have invented a certain new and Improved Meter and Outlet Box, of which the following is a specification.

Our invention relates to a device adapted to be installed in connection with meters for electric service circuits and comprises a box adapted to carry a meter and to inclose the usual connection block and the connections therefrom to the meter so as to prevent possible tampering or theft of current.

In the accompanying drawings, Figures 1 and 2 are respectively plan and section (on the line 2—2, Fig. 1) of a box embodying our invention in one form; Fig. 3 is a side elevation of the same with the cover raised to permit access to the interior; Figs. 4 and 5 are respectively front and side elevations of an accessory cover plate; and Fig. 6 is a broken perspective of the portion of the apron carrying the securing lug.

In the form of box shown the service wires S enter the box A through a conduit $s$ adapted to be screwed into a hole $s^1$ in one side of the box, while the circuit wires C leading to the lamp or other circuit leave the box through the conduit $c$ screwed into the hole $c^1$ in the other side of the box. The wires to the meter M are branched off through the connection block D which may be of any suitable character—preferably of the type described in our Patent No. 927,383, granted on our co-pending application Serial No. 397,100. This block may be secured within the box A by any suitable means, for example by one of the securing screws $a$ by means of which the box is mounted upon the wall.

The meter M is carried upon the cover B of the box and the wires are led up through holes $t$ in the cover to the meter terminals T, sufficient lengths being employed to permit the cover to be raised without strain upon the binding posts. To cover these wires, binding posts and the holes $t$ when the meter is in service, a removable apron P is provided one end of which engages beneath the flange F on the body of the meter, while the other end is provided with a downwardly projecting lug L, the hole $l$ in which registers with the hole $e$ in the lug E on the side of the box when the cover is closed. A side extension of the lug L is turned under to form a hook $l^1$ which is engaged beneath the lug E, by a slight angular movement of the apron. The bolt O on which is threaded the wing nut $o$ to secure the usual cover $o^1$ for the meter terminal box is carried up through a perforation in the top of the apron and the cover $o^1$ is laid on top of the apron as shown when the latter is adjusted. The shackle of a padlock or seal K being passed through the registering holes $l$ and $e$ the apron is locked securely in position. It cannot be tilted at the end adjacent the meter by reason of its engagement beneath the flange F, while the hook $l^1$ prevents the other end from being lifted, and the shackle of the seal prevents the angular movement of the apron to free the hook from its engagement with the lug E. The other end of the cover is securely held to the box body by lugs G on the latter which enters slots $g$ in the flange of the cover when the box is closed.

While the box may be opened in any suitable way, we prefer to hinge the cover to the body and employ for this purpose pairs of bars R pivoted to the sides of the body and cover to give a parallel ruler motion. This lifts the cover clear of the body of the box an equal distance at each end and maintains the meter in a substantially vertical position, as is highly desirable for its proper operation in some constructions. Furthermore the bars may be placed adjacent one end and in such position that when the cover is open one pair rests against the end of the box, thus supporting the cover in its wide open position and giving free and unobstructed access to the connection block to replace fuses, or to make the various branch connections for test purposes without disturbing the customer's circuit or the register of the meter where a block of the type described in our above mentioned Patent No. 927,383, granted on our application Serial No. 397,100 is employed. The pivots for the bars R may be conveniently made by striking down lugs $r$ which engage in perforations $r^1$ in the sides of the box body or inwardly struck lugs $r^2$ on the cover.

If it is desired to remove the meter the apron P is also removed and the holes $t$ are closed by an accessory cover plate p (Figs. 4 and 5) which is provided with downwardly struck lugs $p^1$ which enter these holes and effectively block the same. A lug with hook corresponding to the lug L on the apron P is provided which engages the lug E in precisely the same manner.

It is obvious that various changes in detail of construction may be made without departing from our invention and we do not limit ourselves to the precise structure shown.

We claim as our invention:

1. A device of the character described having an inclosing casing, a meter testing connection device secured within the same, a cover for said casing adapted to carry externally an electric meter, means for leading constantly maintained electrical connections through said testing device within the casing to said external meter, an apron to inclose said connections and engaging said cover so as to hold it closed and means for sealing said casing and apron together so as to prevent tampering or theft of current, said cover being adapted to be moved to expose said connection device without breaking the circuit through said device to the meter, substantially as described.

2. In a device of the character described, a casing, a meter testing cutout block located within the same and service and circuit wires connected to the same, in combination with a cover hinged to said box adapted to carry an electric meter and perforated to permit the passage therethrough of wires from said cutout block to said meter, together with an apron to cover said perforations and exposed connections and means to seal said apron and cover to the casing so as to prevent tampering or theft of current, said cover being adapted to be raised without interrupting the circuit through said connection block to said meter, substantially as described.

3. In a device of the character described, a casing with a cover therefor adapted to carry an electrical device and permit electrical connections to be led thereto from the interior of the casing, in combination with bars pivoted to said cover and body of the casing, some of said bars being adapted to rest against the end of said casing when the cover is opened, and being arranged to support said cover in a plane substantially parallel to that on which it normally rests when closing the casing, substantially as described.

4. In a device of the character described, the combination of a casing, a movable cover therefor, a meter mounted upon said cover, a meter testing block within the casing, flexible conductors connecting said meter to said block and pivoted connections between said cover and said casing holding the plane of said cover which is vertical when the cover is closed in a vertical position when said cover is opened.

5. In a device of the character described, the combination of a casing, a movable cover therefor, a meter mounted upon said cover, a meter testing block within the casing, flexible conductors connecting said meter to said block, and pivoted parallel ruler bars connected between said cover and said casing and holding the cover parallel to a given plane in both closed and opened position.

6. A meter and outlet box, comprising a casing adapted to be mounted upon a wall, a connection block within the casing adapted to be connected to service and circuit wires, a vertical cover hinged to said casing by parallel ruler bars connecting said cover and casing and adapted to support said cover in a substantially vertical position when opened, in combination with a meter carried by said cover, connections therefrom to said connection block adapted to be maintained without interruption by the opening of the cover and means to prevent access to said connections and electrically live parts of the devices when the cover is closed, substantially as and for the purpose described.

7. In a device of the character described, the combination of a casing, a meter testing block located at one end thereof, a movable cover for said casing, parallel ruler bars connected to said cover and to said casing, the connection with said casing being adjacent to the end remote from said block, a meter secured to said cover, and flexible connections extending from said meter to said block.

In testimony whereof we have signed our names to this specification, in the presence of two subscribing witnesses.

JOSEPH G. SWALLOW.
WALTER E. McCOY.

Witnesses:
L. A. COLEMAN,
O. J. PAULA.